United States Patent
Sedarat et al.

(10) Patent No.: US 11,683,068 B1
(45) Date of Patent: Jun. 20, 2023

(54) SEGMENTED ECHO CANCELLATION FILTER FOR USE IN FULL-DUPLEX COMMUNICATION SYSTEMS

(71) Applicant: Ethernovia Inc., San Jose, CA (US)

(72) Inventors: Hossein Sedarat, San Jose, CA (US); Roy T. Myers, Jr., Morgan City, CA (US); Ramin Shirani, Morgan Hill, CA (US); Darren S. Engelkemier, Menlo Park, CA (US); Christopher Mash, Harpenden (GB)

(73) Assignee: Ethernovia Inc., San Jose, CA (US)

( * ) Notice: Subject to any disclaimer, the term of this patent is extended or adjusted under 35 U.S.C. 154(b) by 0 days.

(21) Appl. No.: 17/449,041

(22) Filed: Sep. 27, 2021

Related U.S. Application Data (60) Provisional application No. 63/084,767, filed on Sep. 29, 2020.

(51) Int. Cl.
*H04B 3/23* (2006.01)
*H04L 5/14* (2006.01)

(52) U.S. Cl.
CPC ............. *H04B 3/237* (2013.01); *H04B 3/231* (2013.01); *H04B 3/232* (2013.01); *H04L 5/1461* (2013.01)

(58) Field of Classification Search
None
See application file for complete search history.

(56) References Cited

U.S. PATENT DOCUMENTS

| | | | |
|---|---|---|---|
| 6,256,383 B1 * | 7/2001 | Chen | H04B 3/23 370/291 |
| 2019/0222296 A1 * | 7/2019 | Khandani | H04B 7/086 |

* cited by examiner

*Primary Examiner* — Walter J Divito
(74) *Attorney, Agent, or Firm* — Schwegman Lundberg & Woessner, P.A.

(57) ABSTRACT

Disclosed are systems, methods, and non-transitory computer-readable media for a segmented ECF that includes multiple filter components to replicate an echo pulse response. The different filter components are used to replicate different portions of the echo pulse response. Each filter components can include filter coefficients of different sizes based on the portions of the echo pulse response that is replicated by the filter component. For example, a filter component that replicates a portion of the echo pulse response that includes a large reflection can include large filter coefficients suitable to replicate the larger reflection. In contrast, a filter component that replicates a portion of the echo pulse response that includes smaller reflections can include smaller filter coefficients that are suitable to replicate the smaller reflection. The output of each of the filter components is combined to replicate the full echo pulse response.

20 Claims, 7 Drawing Sheets

SEGMENTED ECHO CANCELLATION FILTER FOR USE IN FULL-DUPLEX COMMUNICATION SYSTEMS

CROSS-REFERENCE TO RELATED APPLICATIONS

The present application claims the benefit of priority of U.S. Provisional Application No. 63/084,767, filed on Sep. 29, 2020, which is incorporated herein by reference in its entirety.

TECHNICAL FIELD

An embodiment of the present subject matter relates generally to echo cancellation, and more specifically, to a segmented echo cancellation filter (ECF) for use in full-duplex communication systems.

BACKGROUND

A full-duplex communication system is a point-to-point system in which connected devices can communicate with one another in both directions simultaneously. Each signal pulse transmitted in a full-duplex communication system can create an echo pulse response caused by the signal pulse reflecting back to the transmitting device. Echo cancellation is used to cancel these echo pulse responses from the incoming signal received by the device. For example, an ECF uses outgoing data being transmitted by the device to replicate the reflections in each echo pulse response, which can then be used to cancel the echo pulse response from the incoming data received by the device. The ECF replicates the reflections using a series of filter coefficients. In current hardware implementations, the size of each of the filter coefficients (e.g., number of bits) is the same. Accordingly, the size of each filter coefficient is designed to be large enough to replicate the largest possible reflection in the echo pulse response. These larger reflections, however, only occur during a few short spans in the echo pulse response, while most of the reflections are smaller and can be replicated using smaller filter coefficients. Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for a segmented ECF for use in full-duplex communication systems. An ECF uses a series of filter coefficients to replicate reflections in an echo pulse response, which are then used to cancel the echo pulse response from incoming data in full-duplex communication systems. In current hardware implementations, the size of each of the filter coefficients (e.g., number of bits) is the same. Accordingly, the size of each filter coefficient is designed to be large enough to replicate the largest possible reflection. These larger reflections, however, only occur during a few short spans in the echo pulse response, while the majority of the reflections are smaller and can be replicated using smaller filter coefficients.

To alleviate this issue a segmented ECF includes multiple filter components to replicate different portions of the echo pulse response. Each filter components can include filter coefficients of different sizes based on the portion of the echo pulse response that is replicated by the filter component. For example, a filter component that replicates a portion of the echo pulse response that includes major reflections, which are relatively larger in magnitude, can include large filter coefficients suitable to replicate the larger reflection. In contrast, a filter component that replicates a portion of the echo pulse response that includes minor reflections which are relatively smaller in magnitude, can include smaller filter coefficients that are suitable to replicate the smaller reflection. The output of each of the filter components is combined to replicate the full echo pulse response.

Figure 1:
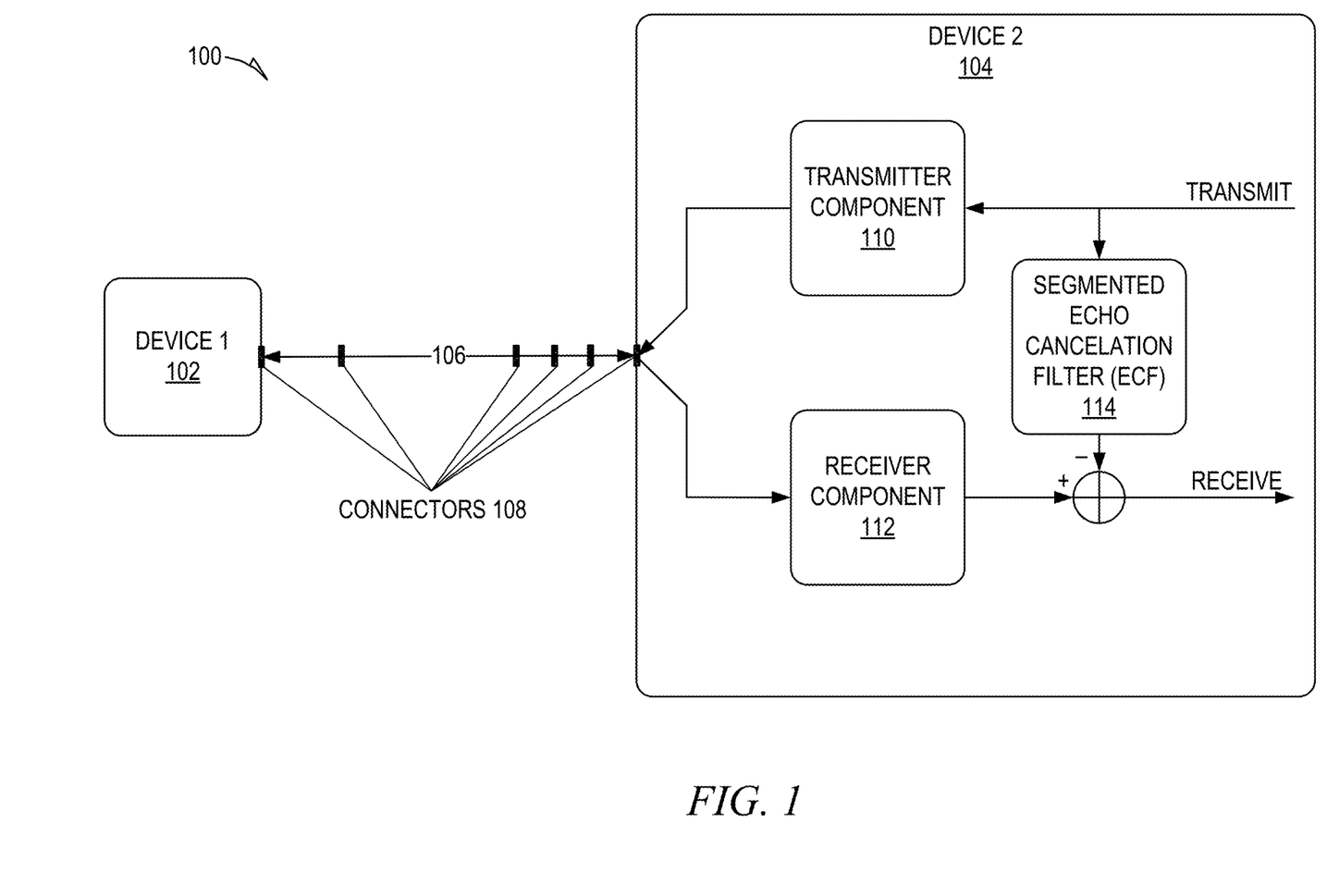
FIG. 1 is a block diagram of a full-duplex communication system using a segmented ECF, according to some example embodiments.

FIG. 1 is a block diagram of a full-duplex communication system 100 using a segmented ECF 114, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a skilled artisan will readily recognize that various additional functional components may be supported by the full-duplex communication system 100 to facilitate additional functionality that is not specifically described herein.

As shown, the full-duplex communication system 100 is comprised of two devices 102, 104 that are interconnected via a communication link 106 for transporting data between the devices 102, 104. The communication link 106 may include a wired communication link, a wireless communication link, or a combination thereof. For example, the communication link 106 may be a twisted pair of copper wire or coaxial cable.

The devices 102, 104 may be any of a variety of types of electrical component that can transmit and/or receive data communications. For example, a device 102, 104 may be a sensor, computing device, input device, display, actuator, switch, speakers, other output device, and the like. The devices 102, 104 can include some or all of the features, components, and peripherals of the machine 700 shown in FIG. 7.

The full-duplex communication system 100 may be implemented in any of a variety of applications to provide for network communication between connected devices 102, 104. For example, the full-duplex communication system 100 may be implemented within a vehicle (e.g., automobile, truck, airplane, ship, etc.) to provide for various electronic features and functionality, including safety-critical features.

In the full-duplex system 100, the devices 102, 104 communicate with each other in both directions simultaneously. For example, each device 102, 104 may simultaneously transmit data to the other device 102, 104 and receive data from the other device 102, 104 via the communication link 106. Accordingly, each device 102, 104 may be both transmitting and receiving data simultaneously via the communication link 106. Signals (e.g., data) transmitted in the full-duplex communication system 100 can create an echo pulse response caused by the signal reflecting back to the device 102, 104 that transmitted the signal. The echo pulse response is comprised of reflections that occur as each pulse of the signal travels across the communication link 106 from one device 102, 104 to the other.

Figure 2:
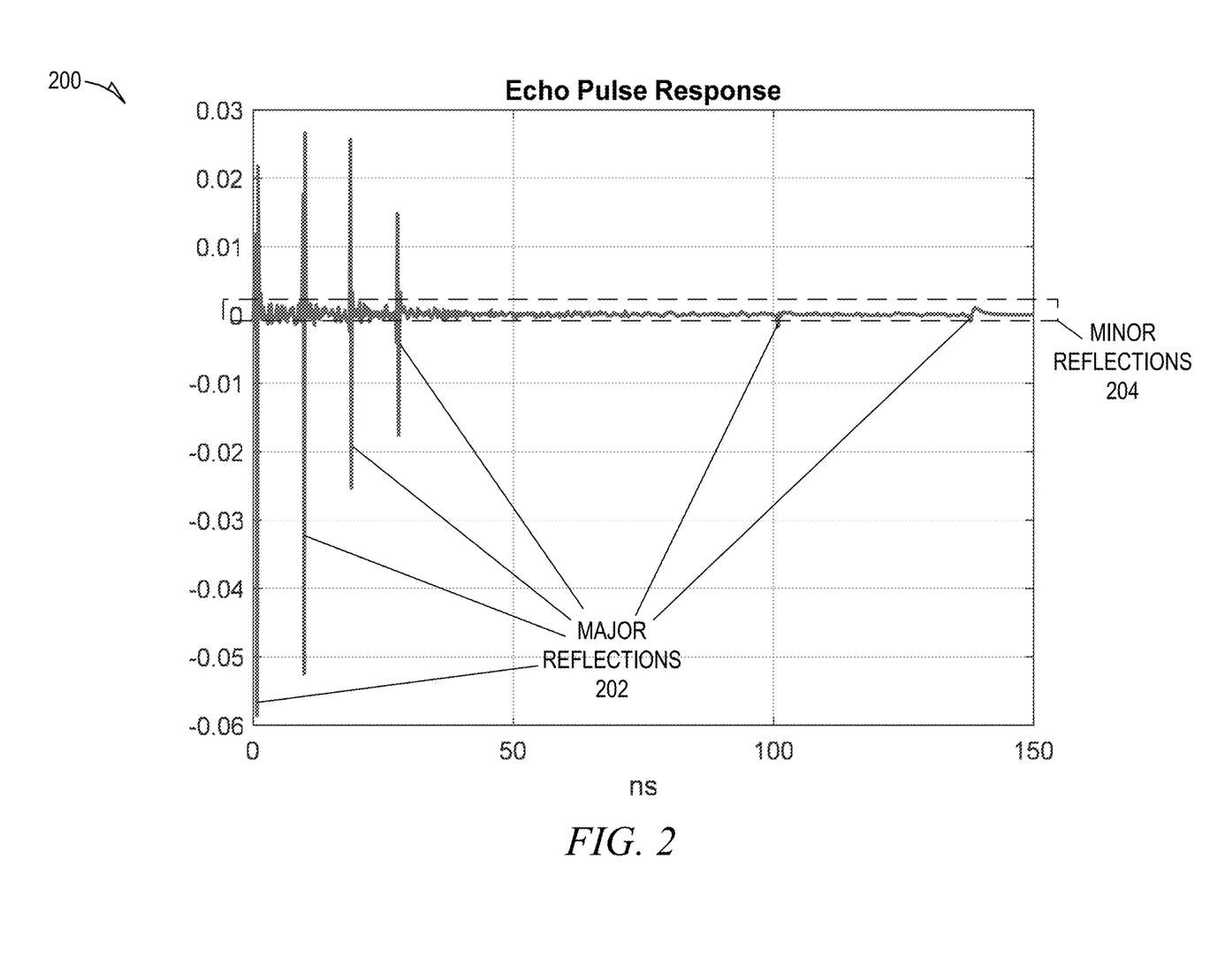
FIG. 2 is an echo pulse response, according to some example embodiments.

The communication link 106 includes various connectors 108 to connect the devices 102, 104 to the communication link 106 as well as to connect various portions (e.g., cables, wires, segments, etc.) of the communication link 106. A signal traversing a connector 108 causes major reflections that are larger in size to the other minor reflections included in the echo pulse response. FIG. 2 shows an echo pulse response 200, according to some example embodiments. As shown, the echo pulse response 200 includes six major reflections 202 that are larger in magnitude to the other continuous minor reflections 204. The major reflections 202 are also relatively short in length in comparison to the continuous minor reflections 204. The major reflections 202 are caused by the signal traversing the connectors 108 as the signal travels along the communication link 106 from one device 102, 104 to the other. Both the major reflections 202 and minor reflections 204 get weaker (e.g., smaller in magnitude) over time as the signal travels farther away from the device 102, 104 that transmitted the signal.

Returning to the discussion of FIG. 1, the devices 102, 104 in the full-duplex communication system 100 use echo cancellation to cancel each echo pulse response 200 from the incoming signals received via the communication link 106. As shown, a device 104 includes a transmitter component 110, a receiver component 112, and a segmented ECF 114. The transmitter component 110 transmits data communications from one device 104 to the other device 102 via the communication link 106. The transmitter component 110 may also convert data from one format into another. For example, the transmitter component 110 may include a digital to analog converter to convert digital data to an analog signal prior to transmission.

The receiver component 112, in contrast, receives data communications transmitted via the communication link 106. The receiver component 112 may also convert data from one format into another. For example, the receiver component 112 may include an analog to digital converter configured to convert analog signal received via the physical link to digital data.

As shown, data provided to the transmitter component 110 for transmission is also provided as input to the segmented ECF 114. The segmented ECF 114 uses the input data to replicate each echo pulse response that will be created as the data travels across the communication link 106. The resulting echo pulse signal includes the replicated echo pulse responses generated by the segmented ECF 114, which can then be subtracted from the incoming data received by the receiver component 112 to cancel each actual echo pulse response.

The segmented ECF 114 uses a series of filter coefficients to replicate the reflections in the echo pulse response. As explained earlier, in current hardware implementations, the size of each of the filter coefficients (e.g., number of bits) included in a ECF is the same. Accordingly, the size of each filter coefficient is designed to be large enough to replicate the largest possible reflection in the echo pulse response. As shown in FIG. 2, these larger major reflections only occur during a few short spans in the echo pulse response, while the majority of the reflections are smaller minor reflections that can be replicated using smaller filter coefficients.

To alleviate this issue a segmented ECF 114 includes multiple filter components to replicate different portions of the echo pulse response. Each filter components can include filter coefficients of different sizes based on the portion of the echo pulse response that is replicated by the filter component. For example, a filter component that replicates a portion of the echo pulse response that includes a major reflection can include large filter coefficients suitable to replicate the larger reflection. In contrast, a filter component that replicates a portion of the echo pulse response that includes minor reflections can include smaller filter coefficients that are suitable to replicate the smaller reflections. The output of each of the filter components is combined to replicate the full echo pulse response, which is then subtracted from the incoming data received by the receiver component 112 to cancel the echo pulse response.

Figure 3:
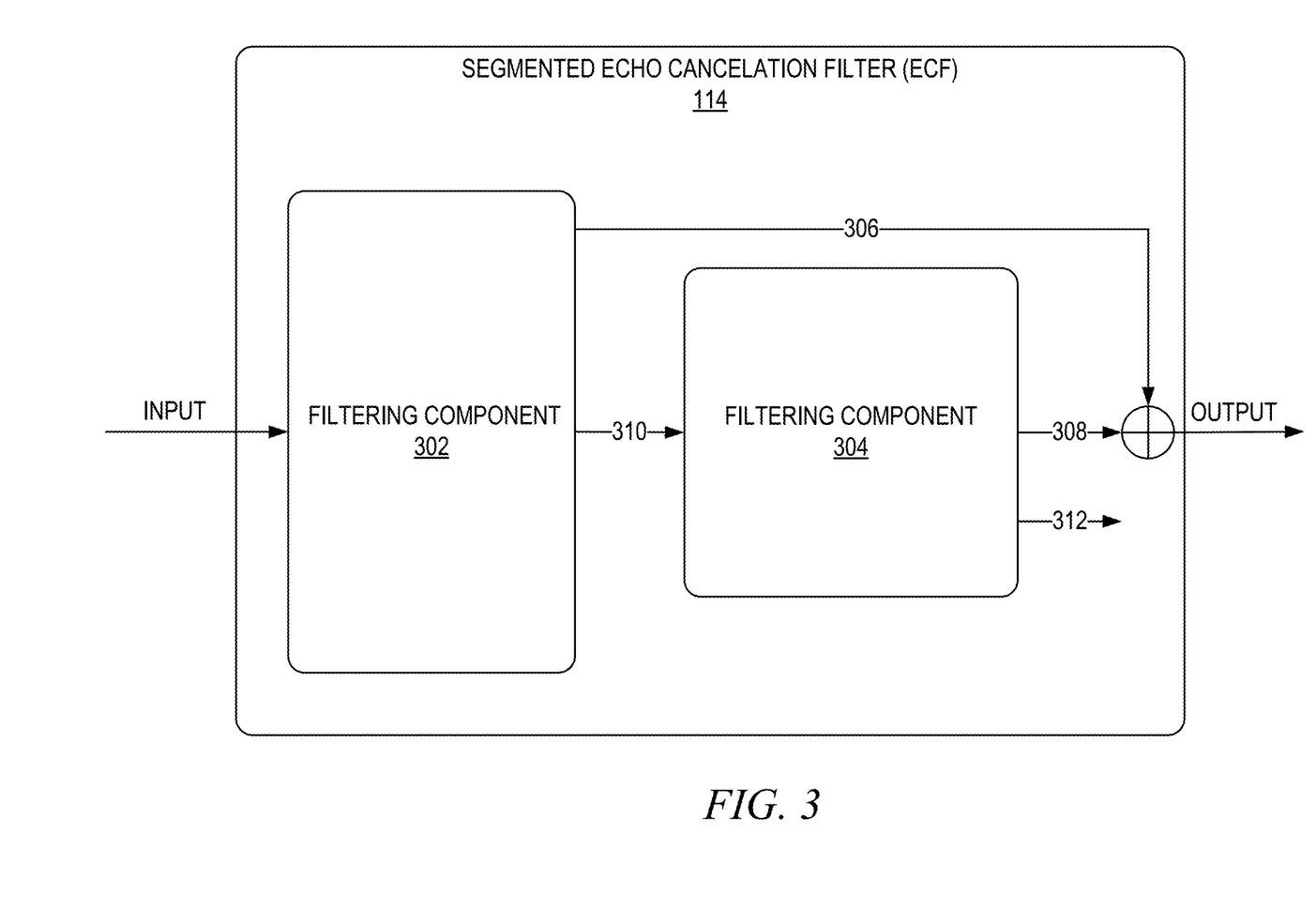
FIG. 3 is a block diagram of a segmented ECF with filtering components aligned sequentially, according to some example embodiment.

FIG. 3 is a block diagram of a segmented ECF 114 with filtering components 302, 304 aligned sequentially, according to some example embodiment. To avoid obscuring the inventive subject matter with unnecessary detail, various functional components (e.g., modules, mechanisms, devices, nodes, etc.) that are not germane to conveying an understanding of the inventive subject matter have been omitted from FIG. 3. However, a skilled artisan will readily recognize that various additional functional components may be supported to facilitate additional functionality that is not specifically described herein.

As shown, the segmented ECF 114 includes two filtering components 302, 304 that are ordered sequentially. The input received by the segmented ECF 114 is first processed by the first filtering component 302 to replicate a first portion of the echo pulse response and then by the second filtering component 304 to replicate a second portion of the echo pulse response that occurs sequentially after the first portion of the echo pulse response. The outputs 306, 306 of the two filtering components 302, 304 are combined to generate an aggregated output replicating both the first portion and the second portion of the echo pulse response.

A delay line is used to control the timing at which the input is processed by each filter coefficient included in the filtering components 302, 304 to properly replicate the timing of the reflections in the echo pulse response. For example, each filtering component 302, 304 includes an internal delay line that controls the timing of the input within the respective filtering component. The input received by each filtering component 302, 304 passes through the delay line, which causes the input to be processed by the filter coefficients included in the filtering components at the appropriate time. The output of each filter coefficient is then combined to generate the output of the filtering component 302, 304, which replicates a respective portion of the echo pulse response.

Figure 4:
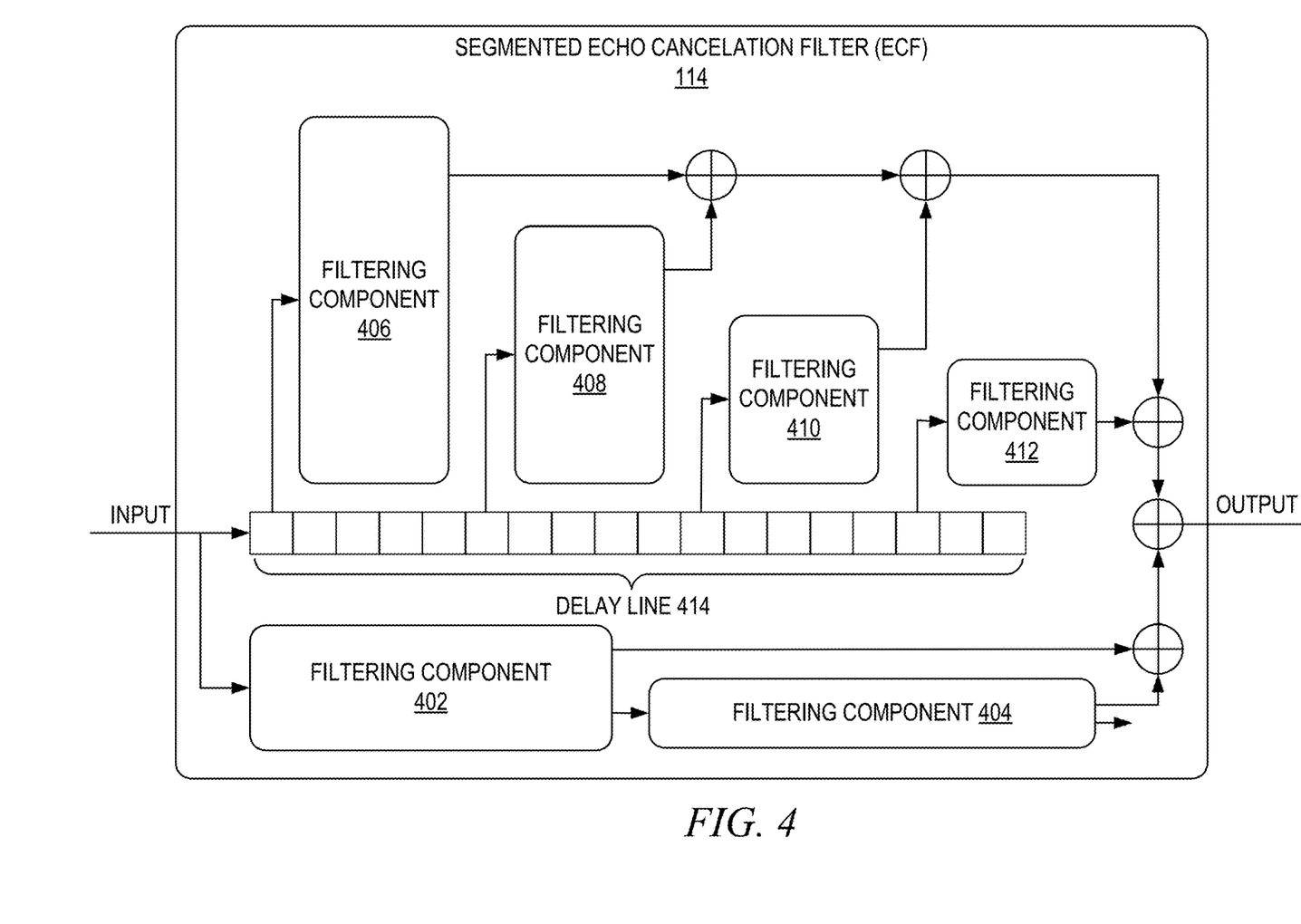
FIG. 4 is a block diagram of a segmented ECF with filtering components aligned in parallel, according to some example embodiment.

When using multiple filtering components 302, 304 that are ordered sequentially, a continuous delay line spanning each filtering component 302, 304 is used to control the timing at which the input is processed by each filter coefficient included in the filtering components 302, 304. The continuous delay line may be separate from the filtering components 302, 304, as is shown in FIG. 4 (e.g., delay line 414) and/or may be created by connecting the internal delay lines in the filtering components 302, 304. For example, the filtering components 302, 304 may be configured to provide a delay line output 310, 312 in addition to the output 306, 308 that replicates a portion of the echo pulse response.

The delay line output 310, 312 of the filtering components 302, 304 is simply the output of the delay line that is within the filtering components 302, 304. The delay line output 310, 312 has therefore not been altered by the filtering coefficients included in the filtering components but is rather the same as the input received by the filtering component 302, 304 after it has passed through the delay line within the filtering component 302, 304.

The delay line output 310 of a filtering component 302 can be provided as input to the subsequent filtering component 304 in the segmented ECF 114 to provide for a continuous delay line spanning each filtering component 302, 304 in the segmented ECF 114.

Although the segmented ECF 114 is shown as including only two filtering components 302, 304, this is only one example and is not meant to be limiting. The segmented ECF 114 may include any number of filtering components 302, 304 arranged sequentially to replicate subsequent portions of the echo pulse response, which may be combined to replicate the full echo pulse response.

As explained earlier, the size (e.g., magnitude) of the reflections in the echo pulse response get smaller over time as the signal travels farther away from the device 102, 104 that transmitted the signal. The size of a filter coefficient (e.g., number of bits) needed to replicate the reflections in the echo pulse response may therefore also become smaller for each subsequent portion of the echo pulse response. Accordingly, each filtering component 302, 304 may be designed to include filter coefficients of different sizes based on the maximum reflection size that will be processed by the respective filtering component 302, 304. For example, the size of the filter coefficients used may be lower for each sequentially ordered filtering components 302, 304 in the segmented ECF 114. For example, the size of the filter coefficient used in the first sequentially ordered filtering component 302 may be larger than each subsequently ordered filtering component 304. Using varying coefficient sizes in the filtering components 302, 304 reduces computing resource usage in the segmented ECF 114 by reducing the number of bits used to replicate smaller reflections in the echo pulse response.

The size of the coefficient filters included in each filtering component 302, 304 as well as the length of each filtering component 302, 304 included in the segmented ECF 114 may be varied and/or designed for the specific implementation. The length of the filtering component 302, 304 defines the length of the portion of the echo pulse response that is replicated by the filtering component 302, 304. In some embodiments, the size of the coefficient filters included in each filtering component 302, 304 may be programmable. For example, the number of bits included in the coefficient filters may be disabled or shut down given the particular application. Disabling some of the bits reduces power usage by the segmented ECF 114.

Additionally, each filtering component 302, 304 may be designed to use any of a variety of implementations using either time-domain filtering or frequency-domain filtering to improve efficiency for the particular application. For example, shorter filtering components 302, 304 may be designed to utilize time domain filtering, while longer filtering components 302, 304 may be designed to utilize frequency domain filtering.

Additionally, the filtering components 302, 304 in a segmented ECF may 114 be configured into either an enabled or disabled state. In some situations, the echo pulse response resulting from transmitting data may be relatively short. For example, a short echo pulse response may result when the communication link 106 is relatively short. In these situations, each filtering component 302, 304 in the segmented ECF 114 may not be needed to replicate the echo pulse response. Accordingly, the filtering components 302, 304 that are not needed to replicate the echo pulse response can be disabled to conserver power. For example, disabling a filtering component 302, 304 may include shutting down power to the filtering components 302, 304 and/or turning off the clock feeding the filtering component 302, 304.

FIG. 4 is a block diagram of a segmented ECF 114 with filtering components aligned in parallel, according to some example embodiment. To avoid obscuring the inventive subject matter with unnecessary detail, various functional components (e.g., modules, mechanisms, devices, nodes, etc.) that are not germane to conveying an understanding of the inventive subject matter have been omitted from FIG. 4. However, a skilled artisan will readily recognize that various additional functional components may be supported to facilitate additional functionality that is not specifically described herein.

The segmented ECF 114 shown in FIG. 4 includes two sets of sequentially ordered filtering components that are ordered in parallel to each other. One set of sequentially ordered filtering components 406, 408, 410, 412 is configured to replicate major reflections in the echo pulse response, while the other set of sequentially ordered filtering components 402, 404 is configured to replicate minor reflections in the echo pulse response. The output of the two sets of sequentially ordered filtering components is combined to generate an aggregated output replicating the entire echo pulse response.

Major reflections, such as those caused by the signal traversing a connector along the communication link 106, have a relatively larger magnitude, but are shorter in duration. Accordingly, the set of sequentially ordered filtering components 406, 408, 410, 412 configured to replicate the major reflections include filter coefficients that are relatively larger in size to replicate the major reflections but are shorter in length. In contrast, minor reflections have a relatively smaller magnitude and span the majority of the echo pulse response. Accordingly, the set of sequentially ordered filtering components 402, 404 configured to replicate the minor reflections are longer in length but include filter coefficients that are relatively smaller in size to replicate the minor reflections.

The input received by the segmented ECF 114 is provided to each set of sequentially ordered filtering components to be processed concurrently. As shown, a delay line 414 is used to provide the input to each filtering component 406, 408, 410, 412 used to replicate the major reflections. The delay line 414 provides for the input to be provided to each filtering component 406, 408, 410, 412 at an appropriate time to properly replicate the timing of the major reflections in the echo pulse response. For example, the delay line 414 includes multiple programmable tap-off point at which the filtering components 406, 408, 410, 412 may be configured to receive the input. This allows for the segmented ECF 114 to be configured to properly replicate the major reflections in any given implementation.

Although the segmented ECF 114 is shown as having six filtering components 402, 404, 406, 408, 410, 412, this is just one embodiment and is not meant to be limiting. The segmented ECF 114 may include any number of filtering components implemented to replicate the major and minor reflections of the echo pulse response. Further, the size of the coefficient filters included in each filtering component 402, 404, 406, 408, 410, 412 as well as the length of each filtering component 402, 404, 406, 408, 410, 412 included in a segmented ECF 114 may be varied and/or designed for the specific implementation. Additionally, each filtering component 402, 404, 406, 408, 410, 412 may be designed to utilize time domain filtering or frequency domain filtering to improve efficiency for the application. For example, shorter filtering components 406, 408, 410, 412 used to replicate the major reflections may be designed to utilize time domain filtering while longer filtering components 402, 404 used to replicate the minor reflections may be designed to utilize frequency domain filtering.

Figure 5:
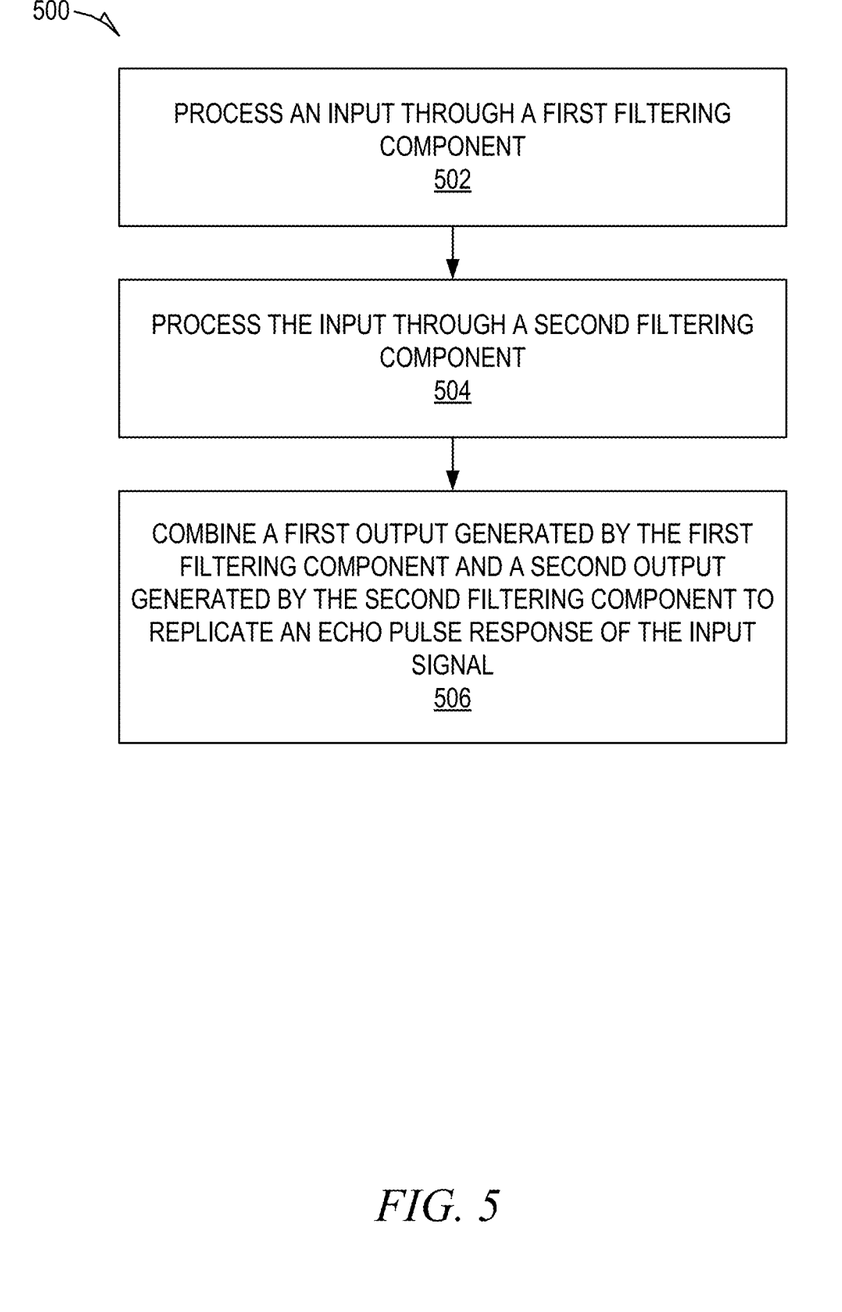
FIG. 5 is a flowchart showing a method for providing echo cancellation in a full-duplex communication system, according to some example embodiments.

FIG. 5 is a flowchart showing a method 500 for providing echo cancellation in a full-duplex communication system, according to some example embodiments. The method 500 may be embodied in computer readable instructions for execution by one or more processors such that the operations of the method 500 may be performed in part or in whole by the segmented ECF 114; accordingly, the method 500 is described below by way of example with reference to the segmented ECF 114. However, it shall be appreciated that at least some of the operations may be deployed on various other hardware and/or software configurations and the methods are not intended to be limited to the segmented ECF 114.

At operation 502, the segmented ECF 114 processes an input through a first filtering component. The first filtering component is configured to receive an input and generate a first output based on the input. The input may be data that is being transmitted from one device 102 to another device 104 along a communication link 106 in a full-duplex communication system 100. The first output replicates a first portion of an echo pulse response of the input that will be generated as the input travels from one device 102 to the other device 104 along the communication link 106. The first filtering component includes a first set of filter coefficients to generate the first output and each filter coefficient included the first set of filter coefficients is a first size. The first size may be based on the magnitude of the largest reflection that can be received in the first portion of the echo pulse response. For example, the first size may include enough bits to properly replicate the largest possible reflection that can be received in the first portion of the echo pulse response.

At operation 504, the segmented ECF 114 processes the input through a second filtering component. The second filtering component is configured to receive the input and generate a second output based on the input. The second output replicates a second portion of the echo pulse response that will be generated as the input travels from one device 102 to the other device 104 along the communication link 106. The second filtering component includes a second set of filter coefficients to generate the second output and each filter coefficient included the second set of filter coefficients is a second size that is different than the first size. Similarly to the first size, the second size may be based on the magnitude of the largest reflection that can be received in the second portion of the echo pulse response. For example, the second size may include enough bits to properly replicate the largest possible reflection that can be received in the second portion of the echo pulse response.

In some embodiments, the first filtering component and the second filtering component are arranged sequentially within the segmented ECF 114 such that the input is processed (e.g., passes through) the first filtering component prior to being processed by the second filtering component. In this type of embodiment, the first portion of the echo pulse response may be sequentially before the second portion of the echo pulse response. As such, the magnitude of the largest reflection that can be received in the second portion of the echo pulse response may be smaller than the magnitude of the largest reflection that can be received in the first portion of the echo pulse response. Accordingly, the second size may be smaller than the first size as the second filtering component does not have to replicate reflection that are as large as those that are replicated by the first filtering component.

In some embodiments, the first filtering component and the second filtering component are arranged in parallel within the segmented ECF 114 such that the input is processed (e.g., passes through) the first filtering component and the second filtering component sequentially. In this type of embodiment, the first portion of the echo pulse response may encompass or otherwise overlap with the second portion of the echo pulse response. For example, the first portion of the echo pulse response that is replicated by the first filtering component may include minor reflections, while the second portion of the echo pulse response that is replicated by the second filtering component may include a major reflection. As such, the magnitude of the largest reflection that can be received in the first portion of the echo pulse response may be smaller than the magnitude of the largest reflection that can be received in the second portion of the echo pulse response. Accordingly, the second size may be larger than the first size as the second filtering component replicates major reflections that are larger than the minor reflections that are replicated by the first filtering component.

At operation 506, the segmented ECF 114 combines a first output generated by the first filtering component and a second output generated by the second filtering component to replicate an echo pulse response of the input. For example, the segmented ECF 114 combines the first output and the second output along with the outputs of any other filtering components included in the segmented ECF to generate an aggregated output that replicates the echo pulse response. The aggregated output may be subtracted from an incoming signal received at a device 102, 104 to provide for echo cancellation.

Software Architecture

Figure 6:
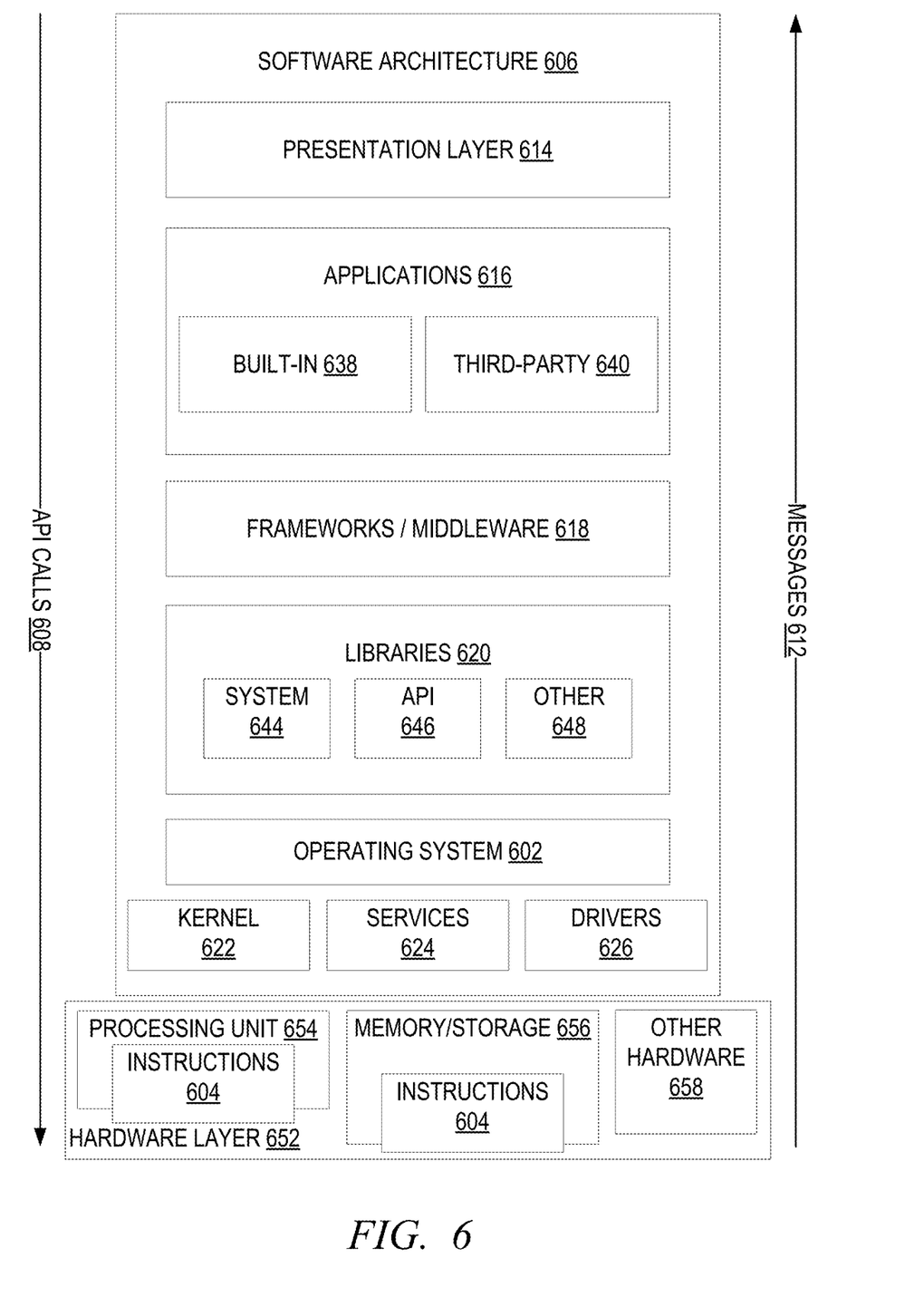
FIG. 6 is a block diagram illustrating an example software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality, such as the Open Systems Interconnection model (OSI model). For example, the software architecture 606 may include layers such as an operating system 602, libraries 620, frameworks/middleware 618, applications 616, and a presentation layer 614. Operationally, the applications 616 and/or other components within the layers may invoke application programming interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
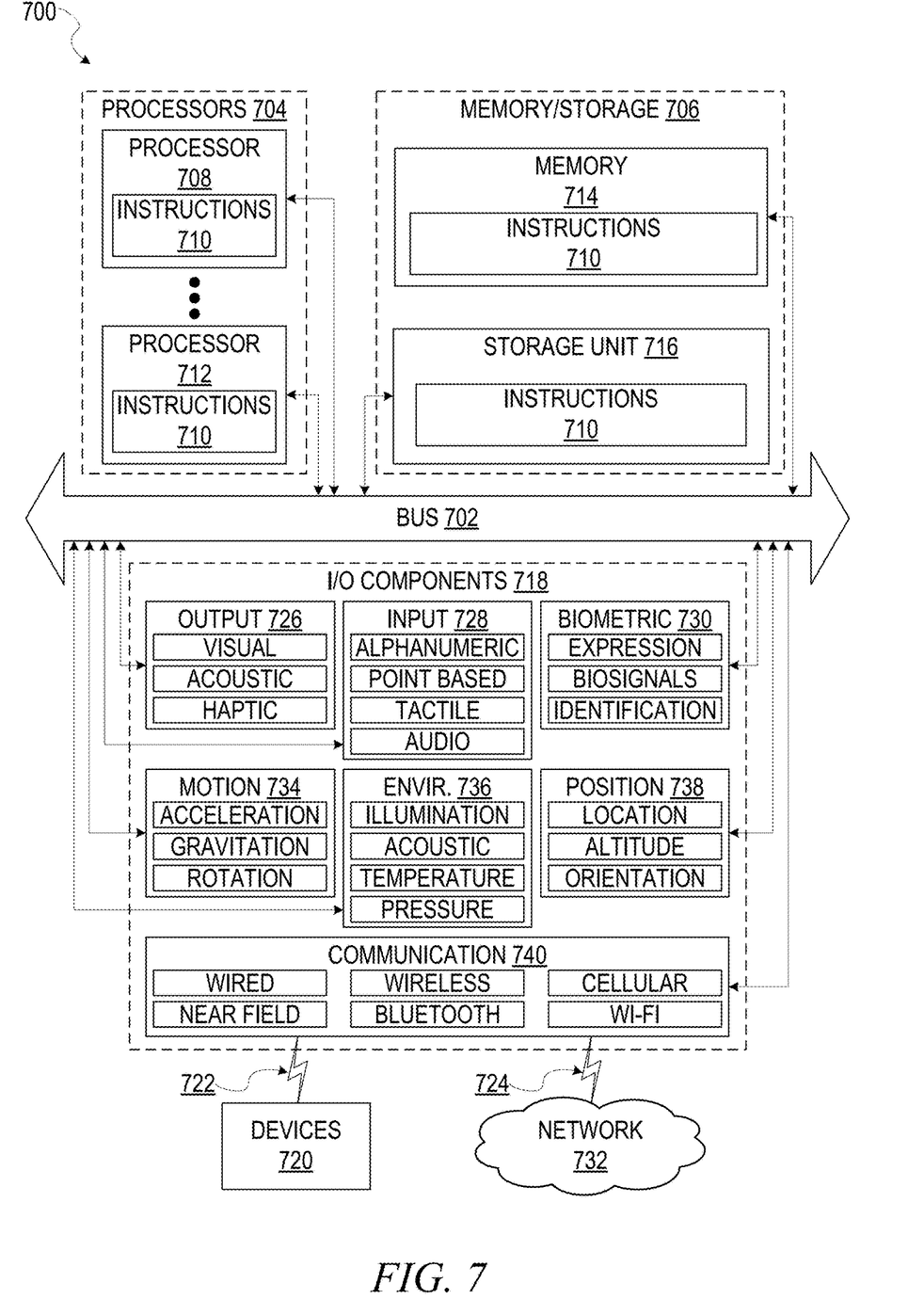
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700.

Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"DEVICE" in this context refers to any machine 700 that interfaces to a communications network 732 to obtain resources from one or more server systems or other devices. A device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 704 (sometimes referred to as "cores") that may execute instructions 710 contemporaneously.

What is claimed is:

1. An echo cancellation filter for use in a full-duplex communication system, the echo cancellation filter comprising:
    a first filtering component configured to receive an input and generate a first output based on the input, the first output replicating a first portion of an echo pulse response of the input, wherein the first filtering component includes a first set of filter coefficients to generate the first output, each filter coefficient included in the first set of filter coefficients is a first size, the first size is smaller than a maximum size of the first filtering component, and at least one bit in each filter coefficient included in the first set of filter coefficients is disabled based on the first size;
    a second filtering component configured to receive the input and generate a second output based on the input, the second output replicating a second portion of the echo pulse response of the input, wherein the second filtering component includes a second set of filter coefficients to generate the second output, and each filter coefficient included the second set of filter coefficients is a second size that is different than the first size; and
    an output generation component configured to combine the first output generated by the first filtering component and the second output generated by the second filtering component, yielding an aggregated output, the aggregated output replicating the first portion of the echo pulse response of the input and the second portion of the echo pulse response of the input.

2. The echo cancellation filter of claim 1, wherein the first filtering component and the second filtering component are arranged sequentially within the echo cancellation filter such that the input passes through the first filtering component prior to passing through the second filtering component.

3. The echo cancellation filter of claim 2, wherein the first size is greater than the second size.

4. The echo cancellation filter of claim 1, wherein the first filtering component and the second filtering component are arranged in parallel within the echo cancellation filter such that the input concurrently passes through the first filtering component and the second filtering component.

5. The echo cancellation filter of claim 4, further comprising:
    a third filtering component configured to receive the input and generate a third output based on the input, the third output replicating a third portion of the echo pulse response of the input, the third filtering component including a third set of filter coefficients to generate the third output, and each filter coefficient included in the third set of filter coefficients is a third size that is different than the second size, wherein the output generation component combines the third output with the first output and the second output to generate the aggregated output.

6. The echo cancellation filter of claim 5, wherein the second filtering component and the third filtering component are arranged sequentially such that the input passes through the second filtering component prior to passing through the third filtering component.

7. The echo cancellation filter of claim 6, wherein the second size is greater than the third size.

8. The echo cancellation filter of claim 6, wherein the second size and the third size are greater than the first size.

9. The echo cancellation filter of claim 6, further comprising:
    a delay line comprising a set of programmable tap-off points at which filtering components may be connected to the delay line, the second filtering component being connected to a first programmable tap-off point of the delay line and the third filtering component being connected to a second programmable tap-off point of the delay line, the second programmable tap-off point of the delay line being positioned sequentially after the first programmable tap-off point.

10. The echo cancellation filter of claim 1, wherein the first size is based on an estimated reflection size included in the first portion of the echo pulse response and the second size is based on an estimated reflection size included in the second portion of the echo pulse response.

11. The echo cancellation filter of claim 1, wherein the first filtering component utilizes time domain filtering and the second filtering component utilizes frequency domain filtering.

12. A method for providing echo cancellation in a full-duplex communication system, the method comprising:
  processing, by an echo cancellation filter, an input through a first filtering component, yielding a first output based on the input, the first output replicating a first portion of an echo pulse response of the input, wherein the first filtering component includes a first set of filter coefficients to generate the first output, each filter coefficient included in the first set of filter coefficients is a first size, the first size is smaller than a maximum size of the first filtering component, and at least one bit in each filter coefficient included in the first set of filter coefficients is disabled based on the first size;
  processing, by the echo cancellation filter, the input through a second filtering component, yielding a second output based on the input, the second output replicating a second portion of the echo pulse response of the input, wherein the second filtering component includes a second set of filter coefficients to generate the second output, and each filter coefficient included the second set of filter coefficients is a second size that is different than the first size; and
  combining, by the echo cancellation filter, the first output generated by the first filtering component and the second output generated by the second filtering component, yielding an aggregated output, the aggregated output replicating the first portion of the echo pulse response of the input and the second portion of the echo pulse response of the input.

13. The method of claim 12, wherein the first filtering component and the second filtering component are arranged sequentially and the echo cancellation filter processes the input through the first filtering component prior to processing the input through the second filtering component.

14. The method of claim 13, wherein the first size is greater than the second size.

15. The method of claim 12, wherein the first filtering component and the second filtering component are arranged in parallel and the echo cancellation filter processes the input through the first filtering component and the second filtering component concurrently.

16. The method of claim 15, further comprising:
  processing the input through a third filtering component, yielding a third output, the third output replicating a third portion of the echo pulse response of the input, the third filtering component including a third set of filter coefficients to generate the third output, and each filter coefficient included in the third set of filter coefficients is a third size that is different than the second size, wherein the third output is combined with the first output and the second output to generate the aggregated output.

17. The method of claim 16, wherein:
  the second filtering component and the third filtering component are arranged sequentially such that the echo cancellation filter processes the input through the second filtering component prior to processing the input through the third filtering component,
  the second size is greater than the third size, and
  the second size and the third size are greater than the first size.

18. The method of claim 16, wherein the first portion of the echo pulse response encompasses both the second portion of the echo pulse response and the third portion of the echo pulse response.

19. The method of claim 12, wherein the first size is based on an estimated reflection size included in the first portion of the echo pulse response and the second size is based on an estimated reflection size included in the second portion of the echo pulse response.

20. The method of claim 12, wherein the input is a first input, the method further comprising:
  receiving a second input to program the first filtering component to include filter coefficients of the first size; and
  disabling the at least one bit in each filter coefficient included in the first set of filter coefficients based on the first size.

* * * * *